(12) United States Patent
Huntzicker

(10) Patent No.: US 9,193,232 B2
(45) Date of Patent: Nov. 24, 2015

(54) TELEMATICS FOR A TOWED VEHICLE

(71) Applicant: GM GLOBAL TECHNOLOGY OPERATIONS LLC, Detroit, MI (US)

(72) Inventor: Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 129 days.

(21) Appl. No.: 13/872,476

(22) Filed: Apr. 29, 2013

(65) Prior Publication Data

US 2014/0324248 A1    Oct. 30, 2014

(51) Int. Cl.
*B60D 1/24* (2006.01)
*B60L 3/04* (2006.01)
*B60K 6/547* (2007.10)

(52) U.S. Cl.
CPC ........................................ *B60D 1/24* (2013.01)

(58) Field of Classification Search
CPC   B60C 23/00; B60C 23/009; B60R 21/01566; B60R 25/06; B60L 3/04; B60L 3/0046; B60L 11/1861; G06Q 10/06; G08B 25/016; B60T 8/1708; B60T 1/10; B60T 7/12; B60D 1/24; H04B 1/667; H04L 63/083; F02N 11/0837

USPC ............... 701/22, 2, 70, 102; 455/422.1, 441; 340/902, 438; 188/122 A; 704/201, 704/225; 74/730.1; 70/247
See application file for complete search history.

(56) References Cited

U.S. PATENT DOCUMENTS

| | | | | |
|---|---|---|---|---|
| 4,181,822 | A * | 1/1980 | Workman | 704/201 |
| 6,516,925 | B1 * | 2/2003 | Napier et al. | 188/112 A |
| 7,446,650 | B2 * | 11/2008 | Scholfield et al. | 340/438 |
| 2004/0112171 | A1 * | 6/2004 | Kuhstrebe et al. | 74/730.1 |
| 2007/0149184 | A1 * | 6/2007 | Viegers et al. | 455/422.1 |
| 2007/0150267 | A1 * | 6/2007 | Honma et al. | 704/225 |
| 2007/0151314 | A1 * | 7/2007 | Andres et al. | 70/247 |
| 2009/0170473 | A1 * | 7/2009 | Bauernfeind et al. | 455/411 |
| 2010/0156667 | A1 * | 6/2010 | Bennie et al. | 340/902 |
| 2011/0288700 | A1 * | 11/2011 | Pebbles | 701/22 |
| 2013/0035839 | A1 * | 2/2013 | Otanez et al. | 701/102 |
| 2013/0311058 | A1 * | 11/2013 | Wojtkowicz et al. | 701/70 |

* cited by examiner

*Primary Examiner* — Tuan C. To
*Assistant Examiner* — Yuri Kan
(74) *Attorney, Agent, or Firm* — Cantor Colburn LLP

(57) ABSTRACT

A telematics system for a vehicle to be towed is provided. The telematics system includes a vehicle communication network configured to receive vehicle data from at least one vehicle system of a plurality of vehicle systems. The telematics system also includes a telematics module configured to determine a towing mode status of the vehicle, generate telematics data based on the vehicle data, and transmit the telematics data to a remote access system based on the towing mode status of the vehicle indicating that the vehicle is configured to be towed.

20 Claims, 4 Drawing Sheets

TELEMATICS FOR A TOWED VEHICLE

FIELD OF THE INVENTION

Exemplary embodiments of the invention relate to telematics for a vehicle and, more particularly, to a telematics system for a towed vehicle.

BACKGROUND

Modern vehicles can include a number of sensors that support monitoring of various vehicle systems, such as speed sensors, tire pressure sensors, fuel level sensors, door sensors, parking assist sensors, and the like. Vehicle system sensors are typically active when the vehicle is powered and in an operable state. Sometimes vehicles may be towed by a towing vehicle. When towing a vehicle in a flat-towing configuration, such as behind a recreational vehicle, the road wheels of the towed vehicle make contact with a driving surface and can add to the total mileage of the towed vehicle. This towed vehicle mileage may not be accurately accounted for within the towed vehicle if a powered odometer system is used. Towed vehicle mileage may result in reduced tire life or reduce the life of other wear-related vehicle components; however, the towed vehicle mileage may not reduce the life of various vehicle engine-related components. Accordingly, tracking towed vehicle mileage within the towed vehicle may be desirable.

An occupant of a towing vehicle may desire to monitor the status of various vehicle systems of a towed vehicle while it is being towed. It may also be desirable to control select subsystems of the towed vehicle from the towing vehicle.

SUMMARY OF THE INVENTION

In one exemplary embodiment of the invention, a telematics system for a vehicle to be towed is provided. The telematics system includes a vehicle communication network configured to receive vehicle data from at least one vehicle system of a plurality of vehicle systems. The telematics system also includes a telematics module configured to determine a towing mode status of the vehicle, generate telematics data based on the vehicle data, and transmit the telematics data to a remote access system based on the towing mode status of the vehicle indicating that the vehicle is configured to be towed.

Another exemplary embodiment of the invention is a method for providing telematics for a vehicle to be towed. Vehicle data are received from at least one vehicle system of a plurality of vehicle systems. A towing mode status of the vehicle is determined. Telematics data are generated based on the vehicle data. The telematics data are transmitted to a remote access system based on the towing mode status of the vehicle indicating that the vehicle is configured to be towed.

In a further exemplary embodiment of the invention, a method for telematics data management for a vehicle to be towed is provided. Telematics data are received at a remote access system from the vehicle based on vehicle data from at least one vehicle system of a plurality of vehicle systems while the vehicle is configured to be towed. The telematics data are displayed on a user interface of the remote access system. A request is received at the remote access system to change a state of one or more of the vehicle systems. One or more commands are transmitted from the remote access system to the vehicle to change the state of one or more of the vehicle systems.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. As used herein, the term module refers to processing circuitry, such as an application specific integrated circuit (ASIC), an electronic circuit, a processor (shared, dedicated, or group) and memory that executes one or more software or firmware programs, a combinational logic circuit, and/or other suitable components that provide the described functionality. The term telematics, as used herein, refers generally to any integration of communication and information processing and is not limited to location tracking or a particular telecommunications protocol.

Figure 1:
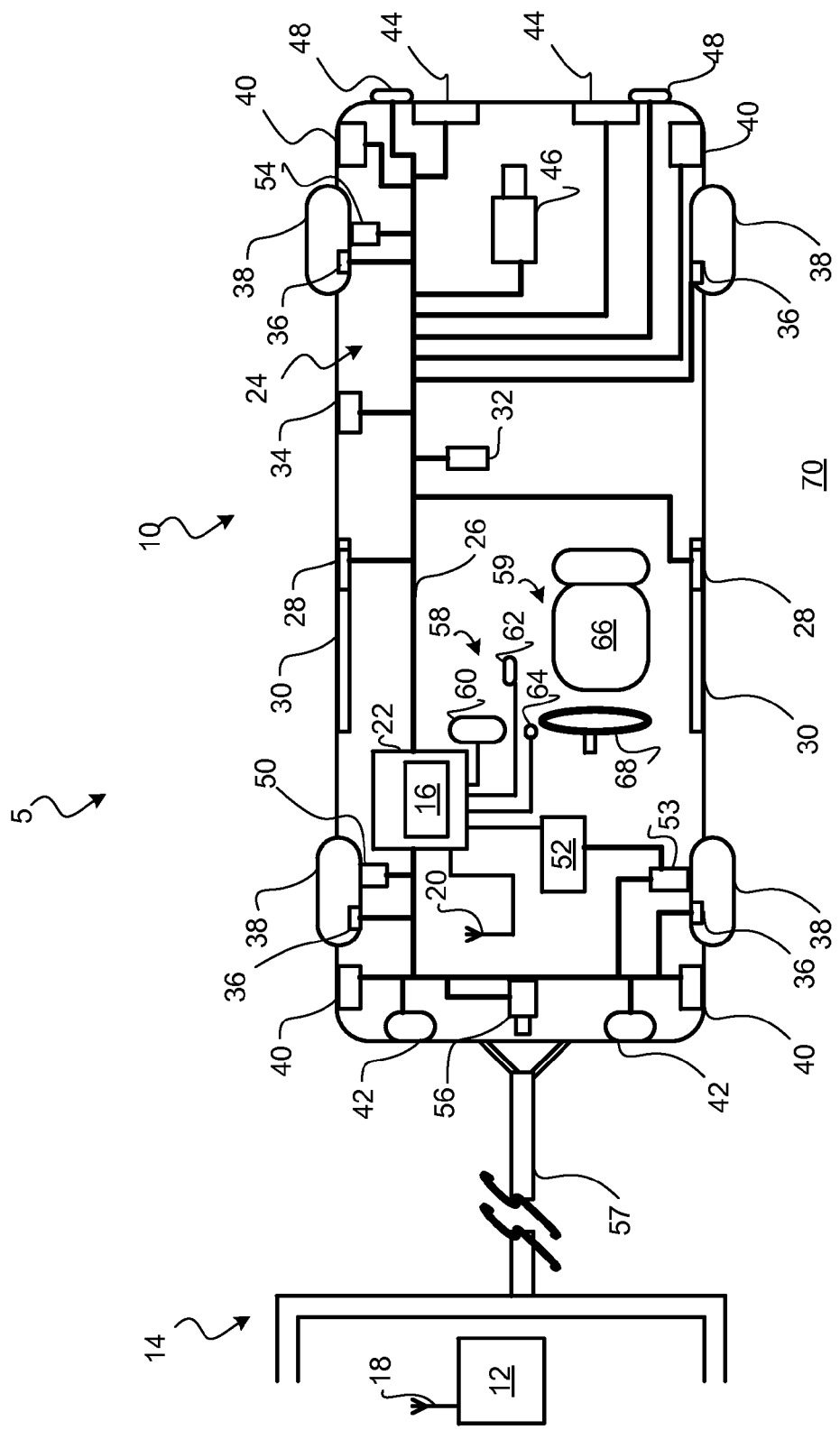
FIG. 1 is an illustration of an exemplary telematics system in a towed vehicle.

Referring now to FIG. 1, an exemplary embodiment is directed to a telematics system 5 that is part of a vehicle 10. The telematics system 5 provides remote access using a remote access system 12 for monitoring and controlling various systems of the vehicle 10. The remote access system 12 may be located, for example, in a towing vehicle 14 that is configured to tow the vehicle 10. The remote access system 12 can communicate with a telematics module 16 of the vehicle 10. A wireless interface 18 of the remote access system 12 may establish two-way wireless communication with a wireless interface 20 of the telematics module 16.

In exemplary embodiments, the telematics module 16 is integrated with or in communication with a control module 22 that is configured to interface with a plurality of vehicle systems 24 using a vehicle communication network 26. The control module 22 may interface directly with the telematics module 16 or may communicate with the telematics module 16 via the vehicle communication network 26. The vehicle communication network 26 can include a number of interfaces and communication links. For example, the control module 22 may interface with door locks 28 of vehicle doors 30, a fuel level sensor 32, a fuel door 34, tire pressure sensors 36 of road wheels 38, directional lights 40, headlights 42, taillights 44, a rear-facing camera 46, one or more rear distance sensors 48, a velocity sensor 50, a battery system 52, a charging system 53, a braking system 54, a tow bar camera 56 to monitor a tow bar 57 coupled between the vehicle 10 and the towing vehicle 14, and other vehicle sensor systems known in the art. The control module 22 can derive a variety of values based on the received signals, such as an odometer value based on a calculated distance derived from the velocity sensor 50.

The control module 22 may also interface with a variety input/output devices 58 in a cabin 59 of the vehicle 10, such as a display system 60, a transmission gear selector 62, and a towing mode control switch 64. The input/output devices 58 are located proximate to a vehicle operator position 66 and may be integrated in whole or in part in a vehicle steering wheel 68. The input/output devices 58 may also or alternatively be integrated in a touch-screen based system or separately located within cabin 59 of the vehicle 10. The towing mode control switch 64 may be used to manually enable/disable use of the telematics module 16. The transmission gear selector 62 may be used as an interlock to the setting towing mode, such that the vehicle may be required to be in neutral for the towing mode control switch 64 to be recognized, thereby avoiding inadvertent activation of the telematics module 16. Alternatively, a state of the transmission gear selector 62 can be monitored and/or controlled by the telematics module 16, but the transmission gear selector 62 is not used as an interlock with the towing mode control switch 64.

The remote access system 12 may be used to monitor and/or control one or more of the vehicle systems 24 via the telematics module 16, for example, while the vehicle 10 is being towed, particularly when two or more road wheels 38 are in contact with a road surface 70 while being towed. In one embodiment, the vehicle 10 includes four road wheels 38 that are in contact with the road surface 70 while the vehicle 10 is coupled to the towing vehicle 14 in a flat-towing configuration.

Figure 2:
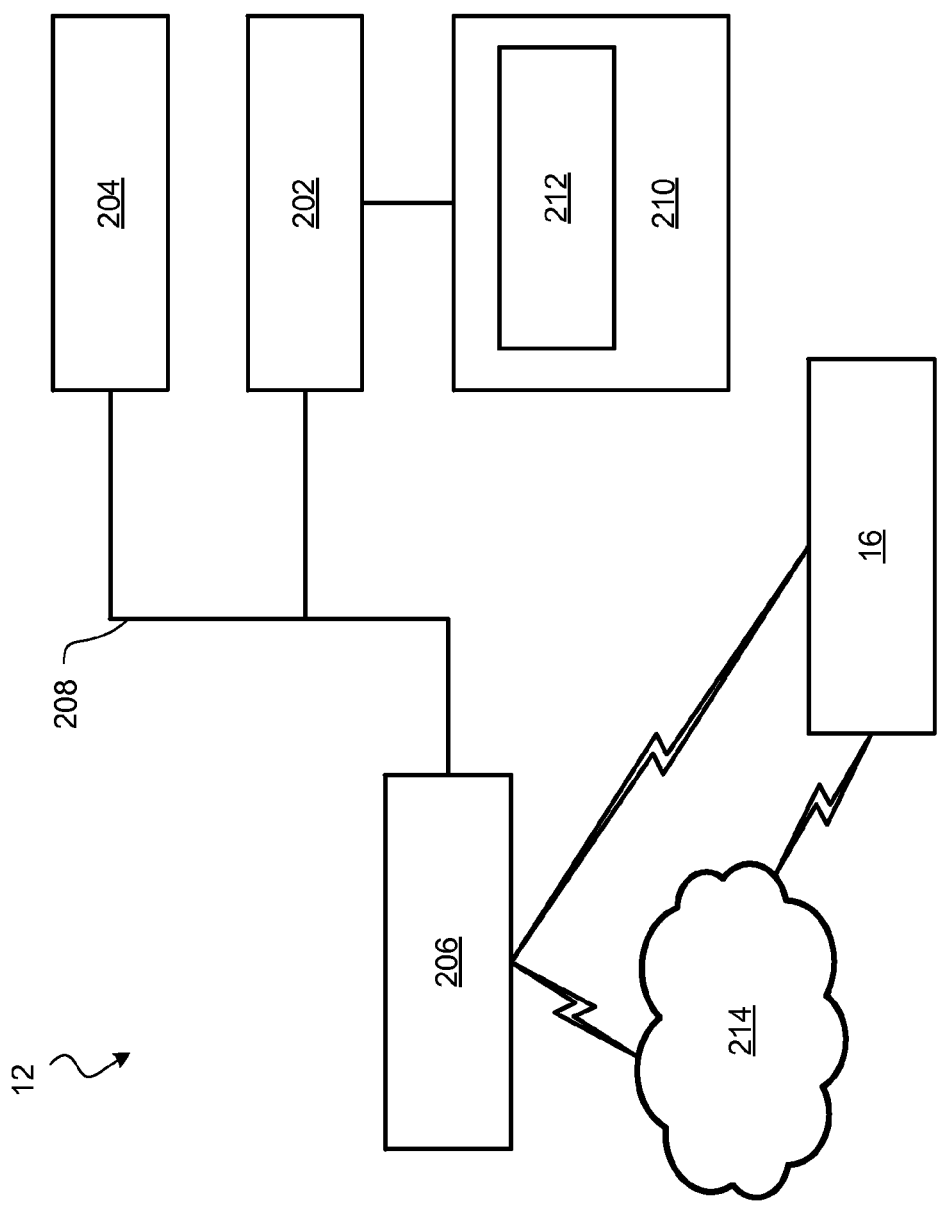
FIG. 2 is an illustration of a remote access system for the telematics system of FIG. 1.

FIG. 2 depicts the remote access system 12 of FIG. 1 according to an embodiment. The remote access system 12 may be implemented as a smartphone, tablet, laptop, onboard computer, or other special-purpose computing device configured to communicate with the telematics module 16 of FIG. 1. The remote access system 12 of FIG. 2 includes processing circuitry 202, a user interface 204, and a communication interface 206 coupled to one or more buses 208. The processing circuitry 202 is communicatively coupled to a memory device 210, which in turn stores logic 212 that is executable by the processing circuitry 202 for processing data and sending requests to the telematics module 16. The processing circuitry 202 may be implemented in one or more application specific integrated circuits (ASICs), electronic circuits, or processors (shared, dedicated, or group). The logic 212 may be one or more software or firmware programs, a combinational logic circuit, and/or other suitable components that provide the described functionality. The logic 212 processes data received via the communication interface 206 and may perform additional formatting and adjustments prior to providing the data to the user interface 204 for display. The logic 212 can also process requests received from the user interface 204, performs further adjustments as needed, and provides the requests to the communication interface 206 to be sent to the telematics module 16.

The memory device 210 may include any type of memory, such as hard disk memory, virtual memory, random access memory, and cache memory. The user interface 204 may be implemented using any suitable display, including those using plasma, light emitting diode, or liquid crystal display technologies. In an embodiment, the user interface 204 may be part of a navigation system of the towing vehicle 14 of FIG. 1 or may be part of an infotainment system of the towing vehicle 14 of FIG. 1.

The communication interface 206 may include the wireless interface 18 of FIG. 1 and be implemented as a transceiver, an OnStar™ communication system, cell network link, a WiFi link, a Bluetooth™ link, or similar networked device. The communication interface 206 may communicate directly with the telematics module 16 (via wireless interface 20 of FIG. 1). Alternatively, the communications can pass through one or more networks 214 between the remote access system 12 and the telematics module 16. The network(s) 214 can include any type of network known in the art, e.g., satellite, cellular, terrestrial, etc. For example, where the remote access system 12 is a cell phone, processing associated with the logic 212 can be an application program that is executed by the processing circuitry 202 on the cell phone, which in turn, communicates via the communication interface 206 over the networks(s) 214, which network(s) 214 may include a short range communication network, such as Bluetooth™ or WiFi. As a further alternative, a wired link can be implemented between the remote access system 12 and the telematics module 16.

Figure 3:
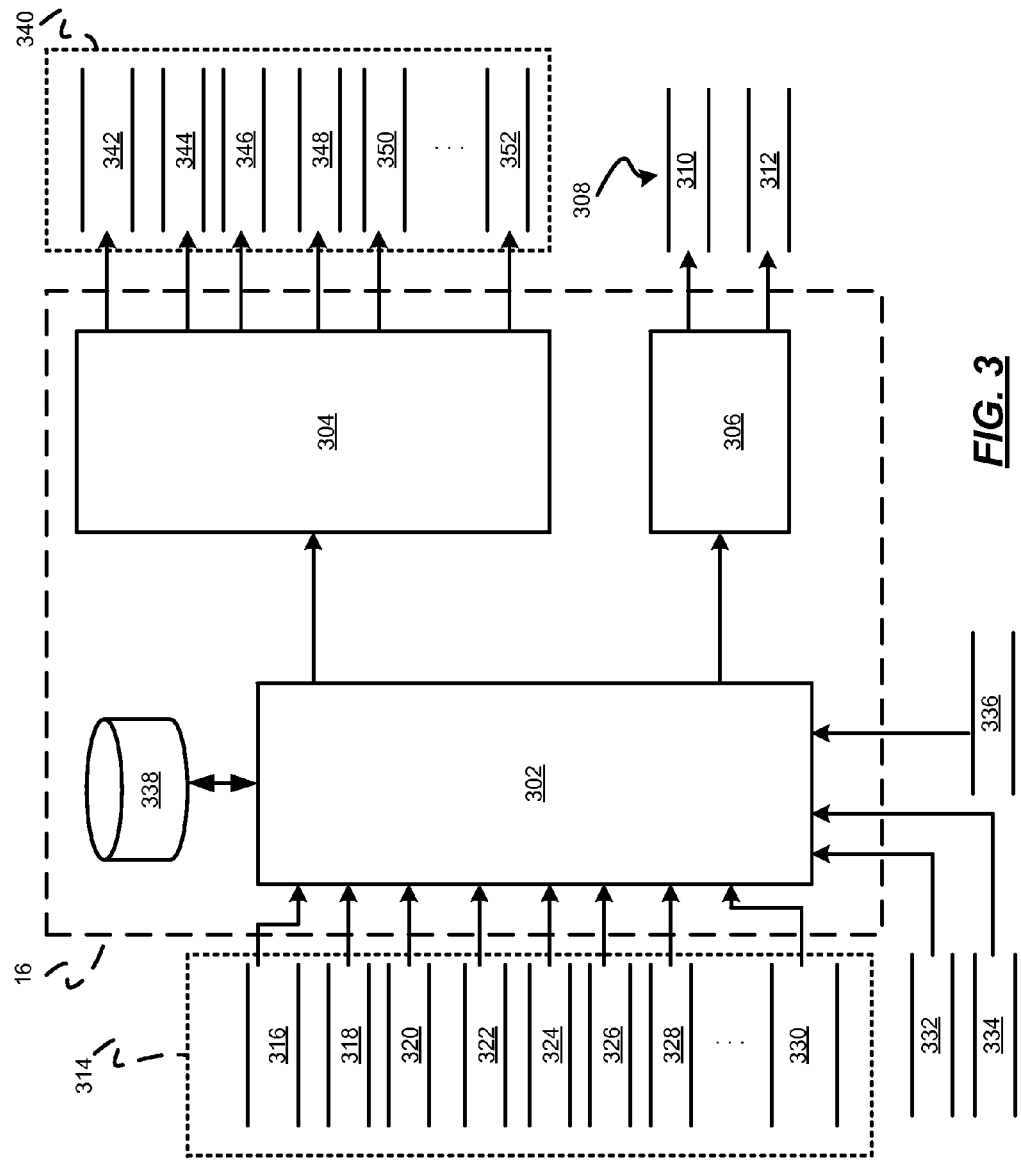
FIG. 3 is a dataflow diagram illustrating a telematics module of the telematics system of FIG. 1.

FIG. 3 is a dataflow diagram illustrating the telematics module 16 of FIG. 1 according to an embodiment. As can be appreciated, various embodiments of telematics module 16 according to the present disclosure may include any number of modules. As can be appreciated, the modules shown in FIG. 3 may be combined and/or further partitioned to similarly perform telematics processing. Inputs to the telematics module 16 may be sensed directly from the vehicle 10 of FIG. 1, received from other modules within the vehicle 10 of FIG. 1, for example, via the vehicle communication network 26 of FIG. 1, and/or determined/modeled by other modules, such as the control module 22 of FIG. 1. In various embodiments, the telematics module 16 includes an input processing module 302, a vehicle command module 304, and a communication output module 306 configured to send telematics data 308 to the remote access system 12 of FIG. 1. The telematics data 308 can include a combination of low bandwidth data 310 and high bandwidth data 312.

The input processing module 302 receives as input vehicle data 314. The vehicle data 314 can be received on the vehicle communication network 26 of FIG. 1 as a plurality of vehicle parameters. The vehicle data 314 can include, for example, but is not limited to, a door lock status 316 of the door locks 28 of FIG. 1, a fuel system status 318 of the fuel level sensor 32 and/or fuel door 34 of FIG. 1, a tire pressure status 320 of the tire pressure sensors 36 of FIG. 1, a lights status 322 of the lights 40-44 of FIG. 1, video signals 324 from the cameras 46 and/or 56 of FIG. 1, a rear distance status 326 from the one or more rear distance sensors 48 of FIG. 1, a vehicle motion status 328 from the velocity sensor 50 and/or braking system 54, a battery system status 330 from the battery system 52 of FIG. 1, and/or other signals indicative of vehicle conditions. The input processing module 302 may also receive a transmission status 332 from the transmission gear selector 62 of FIG. 1 and a towing mode status 334 from the towing mode control switch 64 of FIG. 1. Additionally, the input processing module receives commands 336 from the remote access system 12 of FIG. 1, which may be received via the wireless interface 20 of FIG. 1.

The input processing module 302 analyzes the commands 336 to determine which vehicle signals to send to the communication output module 306 to be sent to the remote access system 12 of FIG. 1. The input processing module 302 also determines whether the commands 336 request any changes of state within the vehicle 10. For example, using the remote access system 12 of FIG. 1, a user may be able to control the state of the lights 40-44 of FIG. 1, the door locks 28 of FIG. 1, the fuel door 34 of FIG. 1, and power moding. Power moding control may enable the vehicle 10 to operate in a battery charging mode whereby motion of the road wheels 38 is used to drive the charging system 53 of FIG. 1 for charging the battery system 52 of FIG. 1. In some embodiments, the commands 336 may also allow for changing the transmission gear selector 62 of FIG. 1, for instance, from park to neutral, where an interlock between the transmission gear selector 62 of FIG. 1 and the towing mode does not exist. The commands may also support starting the vehicle 10 of FIG. 1 and performing preconditioning functions of the cabin 59 of FIG. 1, such as setting a cabin temperature and setting an audio selection.

The input processing module 302 may store user preferences and other data in a data store 338 to establish a towing-mode configuration and record towing data. In one example, the input processing module 302 stores mileage traveled while in towing mode in the data store 338, which may be later used to predict needed maintenance or servicing of the vehicle 10.

Based on the commands 336, the input processing module 302 can send requests and associated data from the vehicle data 314 and the transmission status 332, if needed, to the vehicle command module 304. The vehicle command module 304 can form vehicle system commands 340 to send on the vehicle communication network 26 of FIG. 1 targeting specific vehicle systems. For example, the vehicle system commands 340 can set door lock commands 342 of the door locks 28 of FIG. 1, a fuel door command 344 of the fuel door 34 of FIG. 1, light commands 346 of the lights 40-44 of FIG. 1, a power mode command 348 of the charging system 53 of FIG. 1, a transmission state command 350 of the transmission gear selector 62 of FIG. 1, cabin environment commands 352 to precondition the cabin 59 of FIG. 1, and other configurable system parameters of the vehicle 10 of FIG. 1. The vehicle command module 304 may be implemented in the telematics module 16 or in another module, such as the control module 22 of FIG. 1.

The communication output module 306 can partition and prioritize data received from the input processing module 302 when sending the telematics data 308 to the remote access system 12 of FIG. 1. For example, higher bandwidth data such as video signals 324 from the cameras 46 and/or 56 of FIG. 1 and the rear distance status 326 from the one or more rear distance sensors 48 of FIG. 1 may be grouped as the high bandwidth data 312 for lower latency and higher frequency transmission. Other data values such as the door lock status 316, fuel system status 318, tire pressure status 320, lights status 322, vehicle motion status 328, battery system status 330, and transmission status 332 may be grouped as the low bandwidth data 310 for less frequent transmission. Particular signals may be selected to be transmitted based on the commands 336 or configuration data in the data store 338. Alternatively, all values processed by the input processing module 302 are transmitted by the communication output module 306, and the remote access system 12 of FIG. 1 can further filter or reduce the data as desired. The communication output module 306 may be implemented in the telematics module 16 or in another module, such as the control module 22 of FIG. 1.

Figure 4:
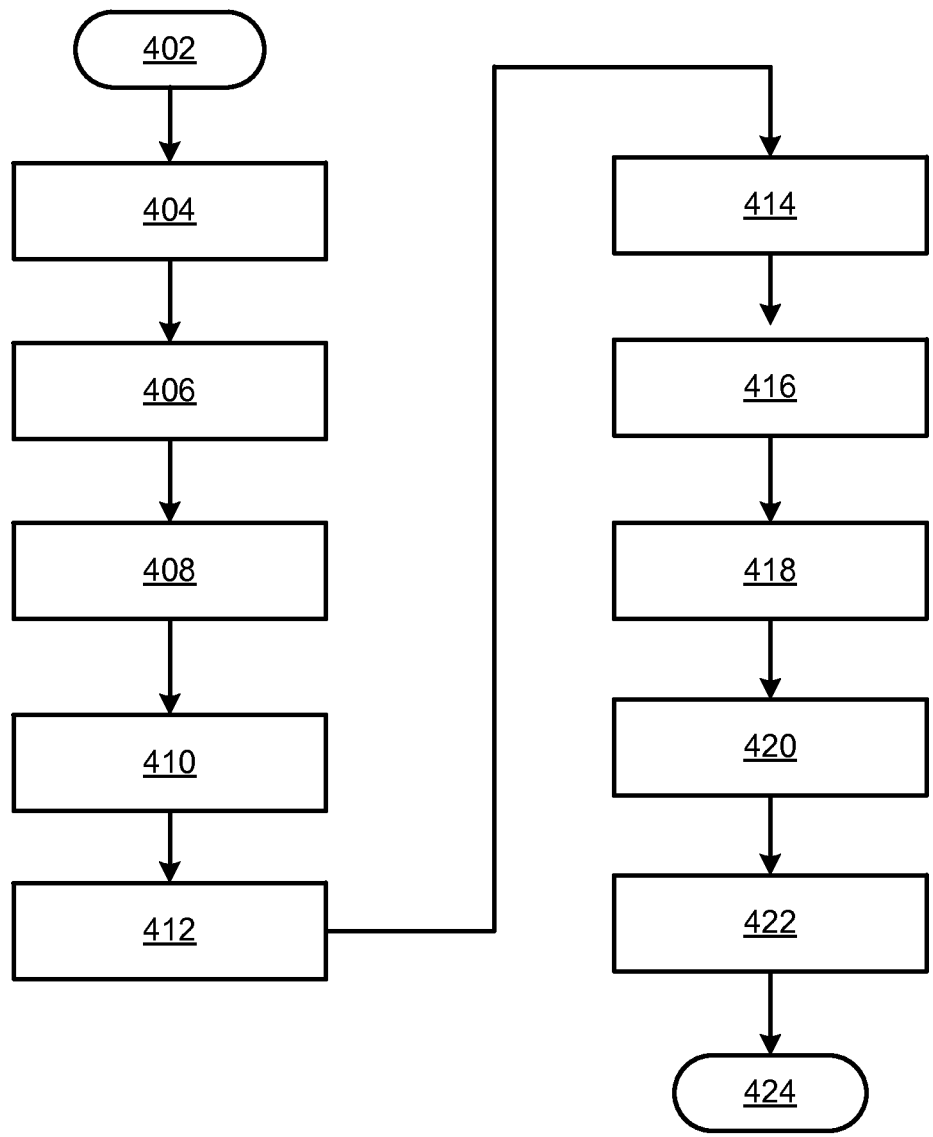
FIG. 4 is a process flow diagram illustrating one embodiment of a method that may be performed in the telematics system of FIG. 1.

FIG. 4 is an exemplary process flow diagram illustrating a method 400 for providing a telematics system for vehicle 10 of FIG. 1. Accordingly, the method 400 is described in reference to FIGS. 1-4. As can be appreciated in light of the disclosure, the order of operations within the method 400 is not limited to the sequential execution as illustrated in FIG. 4, but may be performed in one or more varying orders as applicable and in accordance with the present disclosure. As can further be appreciated, one or more steps may be added or removed without altering the spirit of the method.

Method 400 begins at block 402 and can be performed periodically. At step 404, vehicle data 314 are received from at least one vehicle system of a plurality of vehicle systems 24. The vehicle data 314 may be received at input processing module 302 of the telematics module 16 via the vehicle communication network 26 and in conjunction with the control module 22. At step 406, the towing mode status 334 of the vehicle 10 is determined. The towing mode status 334 may be based on the state of the towing mode control switch 64.

At step 408, telematics data 308 are generated based on the vehicle data 314. The telematics data 308 can be generated by the communication output module 306 based on telematics data 340, the transmission status 332, the towing mode status 334, and/or the commands 336 from the input processing module 302 of the telematics module 16. The input processing module 302 may also store a towed vehicle mileage of the vehicle 10 based on the vehicle data 314 while the towing mode status 334 of the vehicle 10 indicates that the vehicle 10 is configured to be towed.

At step 410, the telematics data 308 are transmitted to remote access system 12 based on the towing mode status 334 of the vehicle 10 indicating that the vehicle 10 is configured to be towed. The telematics data 308 are transmitted to the remote access system 12 in real-time to enable use of the telematics data 308 of the vehicle 10 as an extension of a towing vehicle 14.

At step 412, the remote access system 12 receives the telematics data 308 from the vehicle 10 based on vehicle data 314 from at least one vehicle system of a plurality of vehicle systems 24 while the vehicle 10 is configured to be towed. At step 414, the remote access system 12 displays the telematics data 308 on the user interface 204. At step 416, a request is received at the remote access system 12 to change a state of one or more of the vehicle systems 24. At step 418, one or more commands 336 are transmitted from the remote access system 12 to the vehicle 10 to change the state of one or more of the vehicle systems 24.

At step 420, one or more of the commands 336 are received at the telematics module 16 from the remote access system 12. At step 422, vehicle system commands 340 are sent on the vehicle communication network 26 to change a state of one or more of the vehicle systems 24 based on one or more of the commands 336 received from the remote access system 12. The method 400 ends at 424.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A telematics system for a vehicle to be towed, the telematics system comprising:
a vehicle communication network configured to receive vehicle data from at least one vehicle system of a plurality of vehicle systems;
a towing mode control switch in the vehicle; and
processing circuitry that determines a towing mode status of the vehicle based on a state of a transmission gear selector being in neutral as an interlock to recognize enablement of the towing mode control switch, generates telematics data based on the vehicle data, partitions and prioritizes the telematics data into a group of high bandwidth data having a lower latency and higher frequency transmission and a group of low bandwidth data having a less frequent transmission, and transmits the telematics data to a remote access system according to the groups based on the towing mode status of the vehicle indicating that the vehicle is configured to be towed.

2. The telematics system of claim 1, wherein the telematics system is operable to receive commands from the remote access system.

3. The telematics system of claim 2, wherein the processing circuitry sends vehicle system commands on the vehicle communication network to change a state of one or more of the vehicle systems based on one or more of the commands received from the remote access system, and wherein the vehicle system commands comprise one or more of: a door lock command, a fuel door command, a lights command, a power mode command, a transmission state command, and a cabin environment command.

4. The telematics system of claim 2, wherein based on receiving a power mode command from the remote access system, the telematics system enables a battery charging mode to charge a battery system of the vehicle using motion of one or more road wheels of the vehicle while the towing mode status of the vehicle indicates that the vehicle is configured to be towed.

5. The telematics system of claim 1, wherein the vehicle data comprise one or more of: a door lock status, a fuel system status, a tire pressure status, a lights status, vehicle motion status, and a battery system status as the group of low bandwidth data, and one or more of: a video signal and a rear distance status as the group of high bandwidth data.

6. The telematics system of claim 1, wherein the telematics data are further based on a transmission status of the vehicle.

7. The telematics system of claim 1, wherein the telematics data are transmitted to the remote access system in real-time to enable use of the telematics data of the vehicle as an extension of a towing vehicle.

8. The telematics system of claim 1, wherein the telematics system stores a towed vehicle mileage of the vehicle based on the vehicle data while the towing mode status of the vehicle indicates that the vehicle is configured to be towed.

9. The telematics system of claim 1, wherein the telematics system communicates wirelessly with the remote access system.

10. A method for providing telematics for a vehicle to be towed, the method comprising:
receiving vehicle data from at least one vehicle system of a plurality of vehicle systems;
determining a towing mode status of the vehicle based on a state of a transmission gear selector being in neutral as an interlock to recognize enablement of a towing mode control switch in the vehicle;
generating telematics data based on the vehicle data;
partitioning and prioritizing the telematics data into a group of high bandwidth data having a lower latency and higher frequency transmission and a group of low bandwidth data having a less frequent transmission; and
transmitting the telematics data to a remote access system based on the towing mode status of the vehicle indicating that the vehicle is configured to be towed.

11. The method of claim 10, further comprising receiving commands at the vehicle from the remote access system.

12. The method of claim 11, further comprising sending vehicle system commands on a vehicle communication network to change a state of one or more of the vehicle systems based on one or more of the commands received from the remote access system, wherein the vehicle system commands comprise one or more of: a door lock command, a fuel door command, a lights command, a power mode command, a transmission state command, and a cabin environment command.

13. The method of claim 11, further comprising based on receiving a power mode command from the remote access system, enabling a battery charging mode to charge a battery system of the vehicle using motion of one or more road wheels of the vehicle while the towing mode status of the vehicle indicates that the vehicle is configured to be towed.

14. The method of claim 10, wherein the vehicle data comprise one or more of: a door lock status, a fuel system status, a tire pressure status, a lights status, vehicle motion status, and a battery system status as the group of low bandwidth data, and one or more of: a video signal and a rear distance status as the group of high bandwidth data.

15. The method of claim 10, wherein the telematics data are further based on a transmission status of the vehicle.

16. The method of claim 10, wherein the telematics data are transmitted to the remote access system in real-time to enable use of the telematics data of the vehicle as an extension of a towing vehicle.

17. The method of claim 10, further comprising storing a towed vehicle mileage of the vehicle based on the vehicle data while the towing mode status of the vehicle indicates that the vehicle is configured to be towed.

18. The method of claim 10, further comprising communicating wirelessly with the remote access system.

19. A method for telematics data management for a vehicle to be towed, the method comprising:
receiving telematics data at a remote access system from the vehicle based on vehicle data from at least one vehicle system of a plurality of vehicle systems while the vehicle is configured to be towed, wherein the remote access system is a smartphone or tablet computer, and the telematics data is partitioned and prioritized into a group of high bandwidth data having a lower latency and higher frequency transmission and a group of low bandwidth data having a less frequent transmission;
displaying the telematics data on a user interface of the remote access system, the displaying including a rear distance status based on one or more rear distance sensors of the vehicle as received in the group of high bandwidth data;

receiving a request at the remote access system via the user interface to change a state of one or more of the vehicle systems; and transmitting one or more commands from the remote access system to the vehicle to change the state of one or more of the vehicle systems.

20. The method of claim 19, wherein the one or more commands comprise a power mode command that enables a battery charging mode to charge a battery system of the vehicle using motion of one or more road wheels of the vehicle while the vehicle is configured to be towed.

\* \* \* \* \*